United States Patent [19]
Aratani et al.

[11] 3,868,401
[45] Feb. 25, 1975

[54] ASYMMETRIC SYNTHESIS OF ALKYL CHRYSANTHEMATES

[75] Inventors: Tadatoshi Aratani; Shuzo Nakamura, both of Takatsuki, Japan

[73] Assignee: Sumitomo Chemical Company, Ltd., Osaka, Japan

[22] Filed: Aug. 1, 1972

[21] Appl. No.: 276,946

[30] Foreign Application Priority Data
Aug. 16, 1971 Japan.............................. 46-62411

[52] U.S. Cl. ........................................... 260/468 H
[51] Int. Cl. ............................................ C07c 69/74
[58] Field of Search ................................ 260/468 H

[56] References Cited
FOREIGN PATENTS OR APPLICATIONS
740,014  2/1954  Great Britain ................. 260/468 H Primary Examiner—Lorraine A. Weinberger
Assistant Examiner—Paul J. Killos
Attorney, Agent, or Firm—Wenderoth, Lind & Ponack

[57] ABSTRACT

The invention relates to a process for preparing an optically active alkyl chrysanthemate which comprises reacting 2,5-dimethyl-2,4-hexadiene with an alkyl diazoacetate in the presence of a copper complex coordinated with (a) chiral ligand(s).

14 Claims, No Drawings

ASYMMETRIC SYNTHESIS OF ALKYL CHRYSANTHEMATES

The present invention is a process for producing an optically active alkyl chrysanthemate wherein 2,5-dimethyl-2,4-hexadiene is reacted with an alkyl diazoacetate in the presence of a copper complex coordinated with (a) chiral ligand(s).

Chrysanthemic acid is an important material for synthetic pyrethroids which are effective as insecticides. There are four stereoisomers of chrysanthemic acid: two kinds of geometric isomers, i.e. cis and trans, each including d and l optical isomers. Among them, the pyrethroids derived from d-trans and d-cis chrysanthemic acids are known to be particularly effective in insecticidal power. In this connection, naturally occurring chrysanthemic acid is known to have d-trans structure.

There can be two industrial methods for obtaining optically active chrysanthemic acid. One is to synthesize racemic mixture first, which is subsequently subjected to optical resolution, and the other method is direct asymmetric synthesis. In the former optical resolution, the d and l compounds are produced in equal amounts, and naturally the yield of the d compound never exceeds 50 %. On the other hand, by the latter asymmetric synthesis, the desired optical isomer can be obtained more stereoselectively even at the state of synthesis. Thus, this process may become more advantageous than the optical resolution process.

One of the synthetic processes of chrysanthemic acid is to let an alkyl diazoacetate react with 2,5-dimethyl-2,4-hexadiene in the presence of a copper catalyst and then to hydrolyze the resulting alkyl chrysanthemate.

We have been at work on the asymmetric synthesis of alkyl chrysanthemates, and have attained the present invention. The present invention is a process for producing an optically active alkyl chrysanthemate, characterized by reacting an alkyl diazoacetate and 2,5-dimethyl-2,4-hexadiene in the presence of a copper catalyst coordinated with (a) chiral ligand(s).

This invention presents a unique novel process for obtaining optically active alkyl chrysanthemates in one step by the action of a catalytic amount of a chiral substance without participation of living organisms.

The chiral ligand in the chiral copper complex used as catalyst in the reaction of the present invention may be any compound or ion which has chiral structure as well as ability to coordinate to copper or copper ion, and the choice of which is not particularly limited. Thus any of the following atoms may act as the donor atom of the ligand namely: nitrogen, phosphorus, arsenic, antimony, oxygen, sulfur, selenium, etc. In the present invention, among the molecules or ions containing one or more of these donor atoms, those having chiral structure are used as chiral ligands. A chiral copper complexes containing (an) achiral ligand(s) as well as (a) chiral ligand(s) or anion(s) simultaneously are also useful. The valence of copper may be 0, 1 or 2.

In the actual practice of the present invention, the reaction can be carried out regardless of whether the copper complex is soluble or insoluble in the reacting system. The catalyst may be recovered and purified by some appropriate method for repeated uses.

In the following a further explanation shall be presented on the chiral copper complexes used as catalysts in the present invention.

Among the complexes containing divalent copper, chiral complexes which are represented by the following general formula are particularly useful:

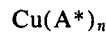

$$Cu(A^*)_n$$

wherein $A^*$ is an anion having chiral structure. Its electric charge is ordinarily -1 or -2. According to whether the charge is -1 or -2, n takes the value of 2 or 1, respectively. Complexes containing two different anions, each carrying a charge of -1, are also useful. The choice of anions having chiral structure is not particularly limited, but the use of conjugated bases of the following compounds is especially advantageous. Such compounds include β-dicarbonyl compounds, β-ketoimines, oxyimines, amino alcohols, amino acids, carboxylic acids, etc. having chiral structure.

Among the above-mentioned chiral oxyimines, the Schiff bases derived from chiral primary amines and salicylaldehyde derivatives are particularly useful. Among chiral primary amines, α,β-diphenylethylamine derivatives such as α,β-diphenylethylamine, α-phenyl-β-(p-tolyl)ethylamine, α-(p-tolyl)-β-phenylethylamine, α-phenyl-β-(p-chlorophenyl)ethylamine, etc. are particularly effective. Salicylaldehyde derivatives may include, for example, salicylaldehyde, o-vanillin, 3,5-dibromosalicylaldehyde, 2-hydroxy-3-isopropyl-6-methylbenzaldehyde, 2-hydroxyacetophenone, 2-hydroxy-1-naphthaldehyde, etc.

Among the complexes containing monovalent copper, chiral complexes represented by the following general formula are particularly effective:

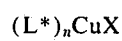

$$(L^*)_n CuX$$

wherein $L^*$ is an electrically neutral ligand having chiral structure, X is a monovalent anion and n is an integer between 1 and 4. There is no particular restriction on the nature of the chiral neutral ligands that can be used and they include, for example phosphines having (a) chiral carbon atoms(s), phosphines having (a) chiral phosphorus atom(s), and phosphites having (a) chiral carbon atom(s). X includes, for example chloride ion, bromide ion, iodide ion and perchlorate ion.

There is no particular restriction on the choice of the alcoholic part of the alkyl diazoacetate used in the reaction of the present invention, though normally lower aliphatic alcohols are employed.

The reaction of the present invention can be carried out either in the absence or presence of a solvent.

Although the reaction temperature is not particularly limited, usually a temperature between −50°C. and 150°C. is suitable. In particular cases of carrying out the reaction at a temperature below the melting point of 2,5-dimethyl-2,4-hexadiene (15°C.), a suitable solvent may desirably be added to the reaction system. Alkyl-substituted benzene derivatives such as toluene are suitable as solvent in such cases.

The present invention is explained in further detail by the examples set forth below. They are not, however, to be taken as being limitative thereof.

In general, an unequivocal correlation exists between the absolute configuration of the substance which induces asymmetry and the absolute configurations of the substance to which asymmetry is induced. Therefore, in this invention, too, it is needless to say that when the copper complex of enantiomeric structure opposite to the one described in the following example is used as the catalyst, the resulting alkyl chrysanthemate also will have the opposite enantiomeric structure.

EXAMPLE 1

0.40 g. of bis(N-α-phenethylsalicylaldiminato)copper of R configuration was dissolved in 22 g. of 2,5-dimethyl-2,4-hexadiene. To this solution, a mixture of 21 g. of the above-mentioned diene and 10 g. of ethyl diazoacetate was added dropwise at 38° – 40°C. over a period of 5 hours. During this time, the reaction was carried out with thorough stirring under an atmosphere of nitrogen. By the end of the addition, evolution of a nearly quantitative amount of nitrogen was observed. From the reaction mixture, unreacted diene was distilled off and then 11.6 g. (yield: 67%) of ethyl chrysanthemate was isolated by distillation under reduced pressure. Gas chromatographic analysis showed that the thus-obtained ethyl chrysanthemate was a mixture of 58% trans and 42% cis compounds. The mixture showed an optical rotation of $\alpha_D$ + 1.05° (neat, 1 dm.). The chrysanthemic acid mixture obtained upon hydrolysis of this ester mixture, showed a specific optical rotation of $[\alpha]_D$ + 3.16° (c = 10.8 g/100 ml. chloroform).

EXAMPLES 2 - 24

In 11 g. of 2,5-dimethyl-2,4-hexadiene, there was dissolved the amount shown in Table 1 of the chiral copper complex generally represented by the general formula, $$Cu^{II}(A^*)_n$$

wherein $n$ is 1 or 2, and $A^*$ represents a coordinating chiral anion whose conjugate acid $A^*H$ is shown in Table 1. To the resulting solution, a mixture of 11 g. of the above-mentioned diene and 5.7 g. of ethyl diazoacetate was added dropwise under stirring over a period of 3 to 5 hours. At the start of the addition, the reaction mixture was once heated to 60°C. but as soon as nitrogen gas evolution began, the mixture was cooled to the reaction temperature shown in Table 1, at which temperature the addition was continued. By the end of the addition, evolution of nearly quantitative amount of nitrogen was observed. The reaction mixture was worked up as in Example 1 to give an ethyl chrysanthemate mixture and then a mixture of free chrysanthemic acid. The yield of the ester with respect to ethyl diazoacetate, ratio of trans/cis of the ester, the optical rotations of the ester, the specific optical rotations of free chrysanthemic acid, and their measurement conditions are given together in Table 1.

Table 1

| Example | Chiral ligand (A*H) | Chiral copper complex (g.) | Reaction temp. (°C.) | Mixture of ethyl chrysanthemate | | | Mixture of free chrysanthemic acid | |
|---|---|---|---|---|---|---|---|---|
| | | | | Chemical yield (%) | Trans/cis | $\alpha_D$ (neat, 1 dm) | $[\alpha]_D$ (chloroform) | c (g/100 ml) |
| 2 | Salicylidene-(+)-α-phenyl-β-(p-tolyl)ethylamine (n = 2) | 0.35 | 30 | 66 | 57/43 | −3.00° | −8.64° | 10.0 |
| 3 | Same as above | 1.75 | 20 | 64 | 55/45 | −4.00° | −11.51° | 9.13 |
| 4 | Salicylidene-(S)phenylalaniol (n = 2) | 0.21 | 30 | 63 | 60/40 | −0.75° | −2.28° | 10.1 |
| 5 | (+)Hydroxymethylenecamphor (n = 2) | 0.22 | 30 | 62 | 64/36 | +0.21° | +0.06° | 11.0 |
| 6 | (+)Hydroxymethylenecamphor-ethylenediimine (n = 1) | 0.24 | 30 | 51 | 68/32 | +0.04° | +0.13° | 10.3 |
| 7 | (−)(S)-Proline (n = 2) | 0.30 | 30 | 48 | 66/34 | +0.10° | +0.05° | 11.0 |
| 8 | Salicylidene-(+)-α-(1-naphthyl)-ethylamine (n = 2) | 0.30 | 20 | 46 | 65/35 | +0.71° | +2.75° | 9.30 |
| 9 | Salicylidene-(−)-menthylamine (n = 2) | 0.30 | 20 | 66 | 55/45 | +0.57° | +1.95° | 9.5 |
| 10 | Salicylidene-(+)-α-phenyl-β-(p-chlorophenyl)-ethylamine (n = 2) | 0.37 | 30 | 49 | 60/40 | −1.91° | −7.17° | 9.76 |
| 11 | Salicylidene-(−)-phenylalanine methyl ester (n = 2) | 0.74 | 40 | 58 | 61/39 | −0.02° | ±0.00 | 5.31 |
| 12 | Salicylidene-(−)-2-amino-1-butanol (n = 2) | 0.64 | 20 | 54 | 61/39 | +0.57° | +1.78° | 4.72 |
| 13 | (+)-Hydroxymethylenecamphor-o-phenylenediimine (n = 1) | 0.25 | 40 | 38 | 67/33 | ±0.00 | +0.01 | 9.0 |
| 14 | (−)-Quinine (n = 2) | 0.66 | 65 | 27 | 67/33 | +0.25° | +0.97° | 2.38 |
| 15 | (−)-Abietic acid (n = 2) | 0.70 | 20 | 39 | 65/35 | −0.03° | −0.10° | 5.17 |
| 16 | (−)-Dibenzoyltartaric acid (n = 1) | 0.75 | 20 | 33 | 62/38 | +0.07° | +0.27° | 5.89 |
| | (3,5-Dibromo-salicylidene)- | | | | | | | |

Table 1 – Continued

| Example | Chiral ligand (A*H) | Chiral copper complex (g.) | Reaction temp. (°C.) | Mixture of ethyl chrysanthemate | | | Mixture of free chrysanthemic acid | |
|---|---|---|---|---|---|---|---|---|
| | | | | Chemical yield (%) | Trans/cis | $\alpha_D$ (neat, 1 dm) | $[\alpha]_D$ (chloroform) | c (g/100 ml) |
| 17 | (+)-α-phenyl-β-(p-tolyl)-ethylamine (n = 2) | 0.62 | 30 | 59 | 58/42 | −2.50° | +8.11° | 5.39 |
| 18 | (3,5-Dibromo-salicylidene)-(−)-methylamine (n = 2) | 1.13 | 40 | 66 | 60/40 | +0.30° | +1.12° | 5.19 |
| 19 | (2-Hydroxy-acetophenone)-(+)-dehydroabiethyl-imine (n = 2) | 0.88 | 20 | 43 | 65/35 | −0.12° | −0.29° | 7.52 |
| 20 | (3-Methoxy-salicylidene)-(+)-α-phenyl-β-(p-tolyl)ethylamine (n = 2) | 0.75 | 20 | 55 | 55/45 | −3.13° | −9.35° | 5.10 |
| 21 | (3-Isopropyl-6-methyl-salicylidene)-(+)-α-phenyl-β-(p-tolyl)ethylamine (n = 2) | 0.75 | 20 | 58 | 58/42 | −3.22° | −9.92° | 5.27 |
| 22 | [2-Hydroxy-naphthyl-(1)-methylene]-(+)-α-phenyl-β-(p-tolyl)ethylamine (n = 2) | 1.00 | 20 | 50 | 58/42 | −3.15° | −9.57° | 5.12 |
| 23 | Salicylidene(−)-α,β-diphenyl-ethylamine (n = 2) | 0.83 | 24 | 67 | 57/43 | +3.36° | +9.64° | 5.30 |
| 24 | Salicylidene(−)-α-(p-tolyl)-β-phenylethylamine (n = 2) | 0.89 | 24 | 67 | 55/45 | +3.54° | +9.94° | 4.88 |

EXAMPLES 25 – 29

To a mixture of 5.5 g. of 2,5-dimethyl-2,4-hexadiene and the amount of the chiral copper complex shown in Table 2, a mixture of 5.5 g. of the above-mentioned diene and 2.85 g. of ethyl diazoacetate was added dropwise over a period of 3 to 4 hours. The reaction mixture was at first heated to the initiation temperature shown in Table 2, but after nitrogen gas evolution began, was cooled to the reaction temperature shown in Table 2. The addition was continued at this temperature. Thereafter, the final reaction mixture was treated as in Example 1 to give the results summarized in Table 2.

Table 2

| Example | Chiral copper complex | Initiation temp. (°C.) | Reaction temp. (°C.) | Mixture of ethyl chrysanthemate | | | Mixture of free chrysanthemic acid | |
|---|---|---|---|---|---|---|---|---|
| | | | | Chemical yield (%) | Trans/cis | $\alpha_D$ (neat, 1 dm) | $[\alpha]_D$ (chloroform) | c (g/100 ml) |
| 25 | Tri(−)-methylphosphite-copper monochloride (0.166 g.) | 38 | 20 | 36 | 65/35 | −0.08° | +0.04° | 4.72 |
| 26 | Bis[tri(−)methylphosphite] copper monochloride (0.455 g.) | 60 | 20 | 30 | 65/35 | −0.64° | −0.10° | 4.84 |
| 27 | Tri(−)isobornylphosphite-copper monochloride (0.30 g.) | 50 | 20 | 34 | 66/34 | −0.54° | −0.19° | 4.31 |
| 28 | Tetrakis [diphenyl-(−)-menthylphosphine]-copper(I) perchlorate (0.80 g.) | 65 | 50 | 24 | 68/32 | +0.21° | +0.43° | 2.54 |
| 29 | (−)-Methyl-phenyl-(o-anisyl)-phosphine-copper monochloride (0.42 g.) | 40 | 20 | 30 | 67/33 | −0.05° | −0.04° | 4.85 |

EXAMPLES 30 – 33

To a solution of bis[(R)-N-α-phenyl-β-(p-tolyl)ethyl-salicylaldimino]copper dissolved in a mixture of 2,5-dimethyl-2,4-hexadiene and toluene, a mixture of the above-mentioned diene, ethyl diazoacetate and toluene was added dropwise over a period shown in Table 3. At the start of the addition, the reaction system was once heated to 60°C. But after nitrogen gas evolution began, heating was stopped and the reaction system was cooled to the reaction temperature shown in Table 3, at which temperature the addition was continued. After the end of the addition, the reaction system was kept at that temperature until the gas evolution ceased. The reaction was carried out with thorough stirring under an atmosphere of nitrogen. In each example, equal amounts of the diene were used both in the catalyst solution and in the diazoacetate solution. The molar ratio of ethyl diazoacetate to the diene in the diazoacetate solution was fixed throughout at 1:2. The weight ratio of toluene to the diene in the catalyst solution was set so as to be 0, 1, 1 and 4, in the Examples 30 – 33, respectively. The amount of toluene in the diazoacetate solution was 0, 0, 0 and 4, respectively, in weight ratio to the diene. The overall scale of the reaction in each Example is shown in Table 3 by the amount of ethyl diazoacetate used. The molar ratio of copper complex to ethyl diazoacetate in every Example was 0.05.

After the end of the reaction, unreacted diene and toluene were distilled off under reduced pressure from the reaction mixtures, followed by distillation of the resulting ethyl chrysanthemate under more reduced pressure. The thus-obtained ester was a mixture of cis and trans compounds, whose ratio of composition by gas chromatographic analysis is shown in Table 3. The ester, after hydrolysis, was purified by distillation to obtain a mixture of free chrysanthemic acid. Optical rotations of the ester and free acid as well as their measurement conditions are shown in Table 3.

b. β-ketoimines,
c. oxyimines,
d. amino-alcohols,
e. amino acids, or
f. carboxylic acids, and wherein n=1 or 2 determined by the number of negative charge of the said anionic conjugate base to neutralize the positive charge of the cupric ion.

3. The process of claim 1 in which said copper-ligand complex is a compound of univalent copper which is given the formula:

$$(L^*)_n CuX$$

wherein L* is an electrically neutral chiral ligand selected from:
  a. phosphines with chiral carbon,
  b. phosphines with chiral phosphorus, or
  c. phosphites with chiral carbon,
and n is an integer between 1 and 4,
and wherein X is a univalent anion selected from:
  a. chloride,
  b. bromide,
  c. iodide, or
  d. perchlorate.

4. The process of claim 2 in which said chiral compound is a Schiff's base which is prepared by combining a chiral primary amine and a derivative of salicylaldehyde.

5. The process of claim 4 in which said chiral primary amine is a derivative of α,β-diphenylethylamine.

6. The process of claim 5 in which said derivative of α,β-diphenylethylamine is
  a. α,β-diphenylethylamine,
  b. α-phenyl-β-(p-tolyl)ethylamine,
  c. α-(p-tolyl)-β-phenylethylamine, or
  d. α-phenyl-β-(p-chlorophenyl)ethylamine.

7. The process of claim 4 in which said salicylaldehyde derivative is
  a. salicylaldehyde,

Table 3

| Example | Ethyl diazo-acetate (g.) | Reaction temp. (°C.) | Period of addition (hours) | Mixture of ethyl chrysan-themate | | | Mixture of free chrysanthemic acid | |
|---|---|---|---|---|---|---|---|---|
| | | | | Chemical yield (%) | Trans/cis | $\alpha_D$ (neat, 1 dm) | $[\alpha]_D$ (chloro-form) | c (g/100 ml) |
| 30 | 2.85 | 10 | 4.5 | 63 | 52/48 | +4.37° | +12.52° | 5.03 |
| 31 | 2.85 | −10 | 4.5 | 49 | 51/49 | +6.23° | +16.53° | 4.70 |
| 32 | 5.70 | −10 | 18 | 59 | 52/48 | +6.37° | +17.31° | 4.61 |
| 33 | 5.70 | −30 | 13 | 34 | 50/50 | +8.39 | +20.55° | 3.26 |

What we claim is:

1. A process for preparing an optically active alkyl chrysanthemate which comprises reacting 2,5-dimethyl-2,4-hexadiene with an alkyl diazoacetate in the presence of a copper catalyst coordinated with a chiral ligand capable of complexing with copper.

2. The process of claim 1 in which said copper-ligand complex is a compound of divalent copper which is given the formula:

$$Cu(A^*)_n$$

wherein A* is an anionic conjugate base derived from a chiral compound selected from:
  a. β-dicarbonyl compounds, b. o-vanillin,
  c. 3,5-dibromosalicylaldehyde,
  d. 2-hydroxy-3-isopropyl-6-methylbenzaldehyde,
  e. 2-hydroxy-acetophenone, or
  f. 2-hydroxy-1-naphthaldehyde.

8. The process of claim 1 in which the alcoholic part of the said alkyl diazoacetate is a lower aliphatic alcohol.

9. The process of claim 1 in which the reaction is conducted in the absence of a solvent.

10. The process of claim 1 in which the reaction is conducted in the presence of a solvent.

11. The process of claim 10 in which said solvent is an alkyl benzene.

12. The process of claim 11 in which said alkyl benzene is toluene.

13. The process of claim 1 in which the reaction is conducted at a selected temperature between −50°C. and 150°C.

14. The process of claim 10 in which the reaction is conducted at a temperature below the freezing temperature of 2,5-dimethyl-2,4-hexadiene.

* * * * *